US010926835B2

(12) United States Patent
Bui et al.

(10) Patent No.: US 10,926,835 B2
(45) Date of Patent: Feb. 23, 2021

(54) POWER ASSISTED FRONT WHEEL DRIVE BICYCLE

(71) Applicant: My Bui, San Diego, CA (US)

(72) Inventors: My Bui, San Diego, CA (US); Nhan Bui, Tucson, AZ (US); Phuong Bui, Tucson, AZ (US)

(*) Notice: Subject to any disclaimer, the term of this patent is extended or adjusted under 35 U.S.C. 154(b) by 56 days.

(21) Appl. No.: 15/629,746

(22) Filed: Jun. 22, 2017

(65) Prior Publication Data
US 2018/0370592 A1 Dec. 27, 2018

(51) Int. Cl.
B62M 6/60 (2010.01)
B62M 6/45 (2010.01)
B62M 6/90 (2010.01)
B62K 21/02 (2006.01)
B62M 9/02 (2006.01)
B60B 1/00 (2006.01)

(52) U.S. Cl.
CPC ............ B62M 6/60 (2013.01); B62K 21/02 (2013.01); B62M 6/45 (2013.01); B62M 6/90 (2013.01); B62M 9/02 (2013.01); B60B 1/003 (2013.01); B62K 2204/00 (2013.01)

(58) Field of Classification Search
CPC . B62M 6/60; B62M 6/45; B62M 6/90; B62K 2204/00
See application file for complete search history.

(56) References Cited

U.S. PATENT DOCUMENTS

| | | | | |
|---|---|---|---|---|
| 2,560,991 A | * | 7/1951 | Schuricht | B62M 9/00 474/69 |
| 3,921,745 A | | 11/1975 | McCulloch | |
| 4,267,898 A | * | 5/1981 | Wheaton | B62M 7/08 180/205.5 |
| 5,937,964 A | * | 8/1999 | Mayer | B62M 6/40 180/205.5 |
| 6,155,369 A | * | 12/2000 | Whittaker | B62M 6/90 180/206.5 |
| 6,347,682 B1 | | 2/2002 | Buchner | |
| 6,557,657 B2 | * | 5/2003 | Persson | B62M 6/10 180/220 |
| 6,571,899 B2 | * | 6/2003 | Simons | B62M 6/60 180/206.1 |
| 8,047,320 B2 | * | 11/2011 | Hadley | B62M 6/60 180/206.5 |

FOREIGN PATENT DOCUMENTS

GB 2330119 4/1999

* cited by examiner

Primary Examiner — Ruth Ilan
Assistant Examiner — Michael R Stabley
(74) Attorney, Agent, or Firm — MDIP LLC

(57) ABSTRACT

The present invention describes power assisted system (PAS) driving the front wheel of a bicycle, including kits and bicycles containing said PAS.

17 Claims, 15 Drawing Sheets

POWER ASSISTED FRONT WHEEL DRIVE BICYCLE

CROSS REFERENCE TO RELATED APPLICATION

This application claims benefit under 35 U.S.C. § 119(e) to U.S. Provisional Application No. 62/354,058, filed Jun. 23, 2016, which is incorporated by reference herein in its entirety.

BACKGROUND OF THE INVENTION

Field of the Invention

The present invention relates generally to bicycle propulsion assistance devices, more specifically, the present invention relates to a Power Assist System (PAS) pulley-belt driving at least one wheel of a multi-wheeled bicycle.

Background Information

One of the most practical and efficient modes of transportation is the bicycle. Throughout the years, bicycle designs have evolved and taken on different roles to satisfy different needs. As technology advances, materials such as carbon fibers and titanium have played a major role in weight reduction of the bike. There are suspension bikes with 21 speeds for off-roading, there are wide and flat tires to travel on severe terrains like sand and snow. Overall, the need to travel from one place to another remains unchanged, whereas greater efficiency is the goal.

With the development of new technologies, various types of electric bicycles are available today that can operate on electric and/or manual power. Many different types of electrical bicycles are available and comprise various types of parts, such as motors and batteries. Conventional electrically powered bicycles include a bicycle comprising a pedaling sensor for detecting a main driving force generated by pedaling and a battery current sensor for detecting motor torque based on a battery current supplied from a battery to a motor, in which an auxiliary drive force is generated by a motor and controlled based on an output from the sensor, and a bicycle with a motor for outputting an auxiliary driving force only when a main driving force exceeds a predetermined value.

However, conventional electrically powered bicycles show a problem in that, when running with the main driving force, the motor is not readily controlled with good timing to provide the auxiliary driving force. Further, most electrical powered bicycles utilize a very high torque motor, which may be very heavy, defeating the advantage offered by the weight reducing materials, thereby completely altering the balance and operation of the bike, resulting in losses in mechanical efficiency. In addition, operation of the bike, particularly for long distances, demands large amounts of power, which in turn, requires large and multiple battery units. Such battery units, or arrays, increase the weight, i.e., the load, of the bike, which in and of itself greatly increases the consumption of electric power.

What is needed is a versatile means to assist the rider, which means reduces rider effort necessary to produce increased traction and an efficient power system to afford such a means.

SUMMARY OF THE INVENTION

The present invention describes a Power Assist System (PAS), which PAS utilizes a small, light (weight), brushless electric motor to drive the front wheel of a bicycle by means of a synchronous timing belt-pulley configuration of a relatively small diameter. The motor shaft is attached to a small drive (timing) pulley via a one way bearing fitted at the hub of the pulley. In one aspect, when the motor is not powered, the one way bearing is not engaged to the motor shaft, allowing the wheel to spin freely ("freewheeling") when moving in the forward-direction. When the motor is powered, the one way bearing engages the motor shaft and spins the drive pulley at a relatively high RPM to transfer power by means of a timing belt onto a much larger diameter pulley that is attached to the spokes of the front wheel of, for example, a two-wheeled bicycle. The larger diameter pulley spins at a relatively slower RPM due to the gear reduction configuration. In one aspect, the aspect ratio of the smaller diameter drive pulley compared to the larger diameter wheel pulley is approximately 16:1. And because of the gear reduction, the torque is multiplied from a small motor and easily moves a much heavier load.

In a related aspect, the system may be applied to the front wheel, rear wheel or to both front and rear wheels.

In embodiments, a Power Assist System (PAS) is disclosed including a synchronous (timing) pulley-belt configuration, where the configuration includes a first larger diameter toothed-wheel (timing) pulley, where the first wheel pulley may be made of a hard resin or polymer or low weight composite or combination thereof, which first wheel pulley releasable attaches to the spokes of at least one front wheel of a multi-wheeled bicycle; a second smaller diameter toothed-drive (timing) pulley, where the second drive pulley comprises a one way bearing fitted to the center of the second drive pulley, where the second drive pulley is mechanically connected to a motor shaft; a tooth (timing) belt detachably connected to the first and second pulleys; a light weight electric motor (e.g., brushless) configured to attach to a front fork of a multi-wheeled bicycle; an idle roller mounted on the side of the second drive pulley; an electronic speed control in electrical communication with the motor through a throttle wrist control; and a lithium battery pack.

In embodiments, a power assist system for at least one wheel of a multi-wheeled bicycle is disclosed including a power transfer assembly operatively coupled to (i) a front and/or rear wheel of the multi-wheeled bicycle and (ii) a propulsion system, which propulsion system comprises a motor and idle roller, where the propulsion system is contained on a bracket mounting assembly, and where the bracket mounting assembly is releasably coupled to a fork on the front and/or rear wheel of the multi-wheeled bicycle, where the power transfer assembly has a substantially circular wheel pulley mounted on spokes of the front and/or rear wheel of the multi-wheeled bicycle through a plurality of mounting cubes configured to connect the wheel pulley to the spokes in an evenly distributed pattern around the front and/or rear wheel, where the mounting cubes comprise a 7+/−1 degree slot; an electric speed control electronically coupled to the motor, where the electric speed control is connected to a handle bar or a part of the frame of the multi-wheeled bicycle; and a battery pack electrically coupled to the electric speed control, where the battery pack is connected to a part of the frame of the multi-wheeled bicycle, where when the motor is energized by the electric speed control, the front and/or rear wheel of the multi-wheel bicycle rotates.

In one aspect, the power transfer assembly further includes a substantially circular drive pulley operatively connected to the motor; and a tooth belt operatively engaged with the wheel pulley, drive pulley, and propulsion system. In a related aspect, the wheel pulley diameter to drive pulley diameter ratio is about 16:1, where said drive pulley is positioned between the tire and wheel axle.

In a further related aspect, the drive pulley is connected to the motor through a one way bearing clutch.

In another aspect, the bracket mounting assembly includes an anchoring bracket containing two substantially rectangular parts having substantially semi-circular inner surfaces along their long axis, where the substantially semi-circular inner surfaces are releasably coupled to said fork; the propulsion system; and an attachment means connecting the anchoring bracket to the propulsion system.

In one aspect, the motor is a brushless motor. In a related aspect, the battery is a lithium battery.

In embodiments, a kit is disclosed including a power transfer assembly configured to be operatively coupled to (i) a front and/or rear wheel of the multi-wheeled bicycle and (ii) a propulsion system, which propulsion system comprises a motor and idle roller, where the propulsion system is contained on a bracket mounting assembly, and where the bracket mounting assembly is configured to be releasably coupled to a fork on the front and/or rear wheel of the multi-wheeled bicycle; an electric speed control electronically configured to be coupled to the motor, where the electric speed control is configured to be connected to a handle bar or a part of the frame of the multi-wheeled bicycle; a battery pack configured to be electrically coupled to the electric speed control, where the battery pack is configured to connect to a part of the frame of the multi-wheeled bicycle; a container comprising the power transfer assembly; and a manual comprising instructions on assembling the power transfer assembly.

In one aspect, the power transfer assembly includes a substantially circular wheel pulley mounted on spokes of the front and/or rear wheel of the multi-wheeled bicycle through a plurality of mounting cubes configured to connect the wheel pulley to the spokes in an evenly distributed pattern around the front and/or rear wheel; a substantially circular drive pulley configured to be operatively connected to the motor; and a tooth belt configured to operatively engaged with the wheel pulley, drive pulley, and propulsion system.

In another aspect, the mounting cubes contain a slot configured to match the spoke angle of the front and/or rear wheel of the multi-wheeled bicycle.

In a related aspect, the bracket mounting assembly includes an anchoring bracket containing two substantially rectangular parts having substantially semi-circular inner surfaces along their long axis, where the substantially semi-circular inner surfaces are configured to be releasably coupled to the fork; the propulsion system; and an attachment means configured to connect the anchoring bracket to the propulsion system.

DETAILED DESCRIPTION OF THE INVENTION

Figure 1A:
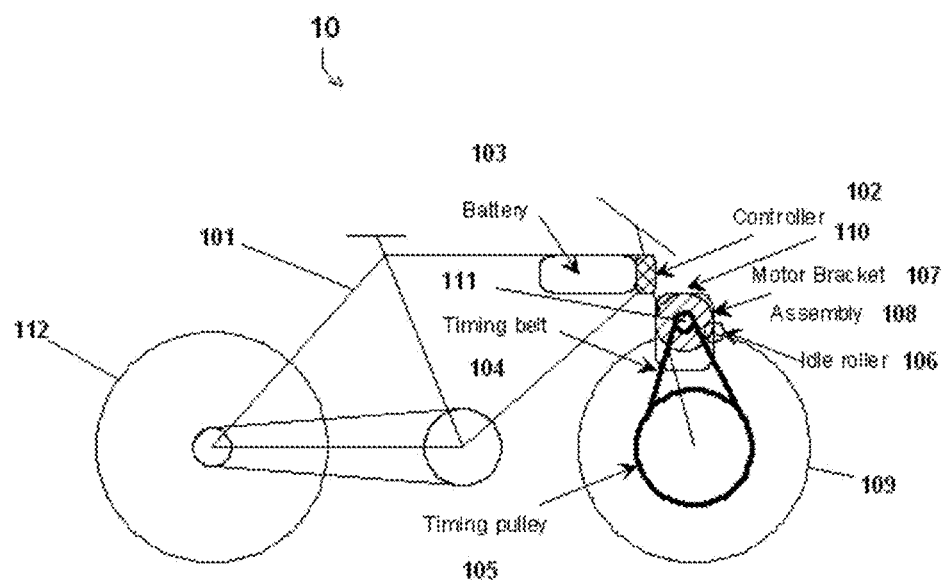
FIGS. 1a and 1b show illustrations of the PAS mounted on a bike.

Before the present composition, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "a wheel" includes one or more wheels, and/or compositions of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

As used herein, "about," "approximately," "substantially" and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term and "substantially" and "significantly" will mean plus or minus >10% of the particular term. In embodiments, composition may "contain", "comprise" or "consist essentially of" a particular component of group of components, where the skilled artisan would understand the latter to mean the scope of the claim is limited to the specified materials or steps "and those that do not materially affect the basic and novel characteristic(s)" of the claimed invention.

As used herein, a cube adaptor with a "self centering angle" means having an attachment means (e.g., cube) that can be made with gripping surfaces always equidistant from a wheel axis based on the angle of the slot contained within said attachment means.

Many electric bikes (e-bikes) are available on the market, but none are light or behave in the same way as a simple bicycle. The PAS as described herein is unique in that it only adds about 5 lbs or less (including the battery) to almost any bike. This is made possible by using, for example, lightweight electric motors (e.g., motors normally used in remote control airplanes). Such motors typically weigh 1.5 lbs or less. Such motors are small, lightweight and exhibit very high rotational speeds (RPMs), with low torque. In order to exploit such motors, this high speed is converted to high torque via use of a synchronous timing belt-pulley system. By using a system that is lightweight, and by strategically positioning the system on the front wheel of the bike to maintain balance, the PAS as disclosed herein provides extra traction by creating an all-wheel drive system: i.e., rear pedal power combined with front wheel drive assist.

In embodiments, the Power Assisted System (PAS) may be a "do-it-yourself" kit designed to make a commute more pleasant by reducing the energy exerted by a rider, and thereby potentially extending the distance traveled.

The PAS is not a system for "electrifying" a bicycle, but as disclosed herein, the PAS does make the bike more versatile for recreational and routine use. For example, in handling a more extreme and/or challenging terrain, a rider will possess a means to readily go off-roading with the assistance of the disclosed PAS. The enhanced traction gain with, for example, two (2) wheels allows a rider to achieve hill climbing challenges, or readily transit across sand or slippery terrain; i.e., the PAS as disclosed allows riders to access terrains/conditions that they would normally bypass using unassisted systems.

The overall PAS as disclosed represents a unique package that may be easily adapted to any existing bike on the market, including tricycles and multi-wheeled bike systems. In doing so, a PAS mounted bicycle represents an enhancement resulting in a more versatile transportation vehicle for both routine and recreational biking (i.e., eliminates the need for multiple types of bikes).

The system as disclosed herein comprises at least 6 components:

1) The power transfer assembly: The assembly is a torque converter, which utilizes a tooth belt, wheel pulley and a drive pulley.

Wheel Pulley (larger diameter pulley): a tooth (timing) pulley about 16' in diameter, is shaped in a similar fashion to a ring, thus minimizing material and reducing weight. This pulley has an evenly distributed mounting hole pattern typically eight (8), however, the number may be modified to fit a particular spoke pattern which will be apparent to one of skill in the art, which pattern provides a means to mount the pulley to the spokes of the bicycle wheel.

Drive Pulley (smaller diameter pulley): a tooth (timing) pulley about 1' in diameter with a one-way bearing fitted to the center of the Drive Pulley. This Drive Pulley slides on to the motor shaft.

A Tooth (timing) Belt: a Tooth Belt connects the Wheel and Drive Pulleys. The use of the Tooth Belt is to provide a non-slip function rather than for synchronization. (See FIGS. 4 and 14).

Mounting Cube: in order to mount the Wheel Pulley to the wheel of the bicycle, a mounting cube was designed with a slanted slot to match with the bicycle wheel spoke angle (about 7+/−1 degrees, but this value may differ depending on the spoking configuration of the wheel). This Mounting Cube is clamped on to the spoke and provides a flat surface for the Wheel Pulley to rest on. The height of the cube is typically 15 mm to provide spacing between the spoke and the Wheel Pulley (See FIGS. 5 and 6), however, as will be apparent to one of skill in the art, this value may be changed to accommodate various spoke configurations. Multiple Mounting cubes are located evenly in a distributed pattern. This pattern ensures an equal load bearing on the spokes such that no one spoke is overly exerted (see FIG. 3).

One-Way Bearing: the Drive Pulley is press-fitted with a One Way Bearing (FIG. 9) in the center. This assembly is slidably connected on to the motor shaft. The One-Way Bearing engages when the motor is energized, rotating the Drive Pulley and transmitting power to the Tooth Belt, which in turn rotates the wheel onto which it is mounted. When the motor is not energized, the One-Way Bearing will disengage from the motor shaft, thereby allowing the wheel on which the system is mounted to be "free-wheeling".

2) The Bracket Mounting Assembly: The Bracket Mounting Assembly comprises:

An Anchor Bracket containing two semi-circular parts which clamp onto one of the fork legs onto which the assembly is mounted.

A Brushless motor is mounted onto the Motor Mounting Bracket. This motor mounting bracket also includes an idle roller to prevent the Toothed Belt from skipping teeth.

A Straight Bar connects the Anchoring Bracket and the Motor Mounting Bracket together.

The Bracket Mounting Assembly is configured in such a way that the Drive Pulley is in the position between the axel and the tire, preferably proximal to the rim of the wheel, and along the legs of the fork. Those locations represent the most efficacious use of space between the wheel axel and the tire. (See FIG. 12). Viewed from the side of the bicycle, the configuration above may be applied on either leg of the fork. In embodiments, this mounting configuration works with both types of front fork disc brakes and/or rim brakes.

3) The Propulsion Unit. The propulsion unit comprises a small, lightweight, high speed, brushless motor. The high speed of the brushless motor is converted into torque via use of a pulley-belt configuration. The lighter the power assist system, the lighter the load, thus, smaller and lighter batteries may be used. Such a system allows for optimized efficiency.

4) Idle Roller: a Idle Roller on the motor bracket positions the roller on the side of the Drive Pulley. This is another advantage of the system as disclosed herein: the Idle Roller prevents Belt Tooth slippage even when the belt is at low tension. (See FIG. 14). The Drive Belt with high tension tends to stretch the belt after some usage. It also creates an axial load on the motor shaft. This load translates into binding friction, which restricts the free spinning of the wheel on which the assembly is mounted. However, during hard acceleration, with little to no belt tensioning, the Drive Belt may become loose and slip off of the Drive Pulley. In order to keep the Tooth Belt in place, and reduce tensioning the load on the Pulleys, an Idle Roller or Guard Post may be installed. The Idle Roller uses ball bearing to guide the Drive Belt in order to increase the amount of angle that the belt wraps around the Drive Pulley, with a minimum of 130 degrees wrapping. The resulting belt path increases available contacting surface (i.e., wrap angle) of the Drive Belt onto the Drive Pulley, thereby allowing the Drive Belt to operate at low tension without slippage.

5) Electronic Speed Control: the speed of the system may be controlled electronically via a throttle wrist control, similar to a motorcycle's throttle.

6) Lithium Battery Pack. Battery power may be supplemented by solar or electro-mechanical means.

Figure 1B:
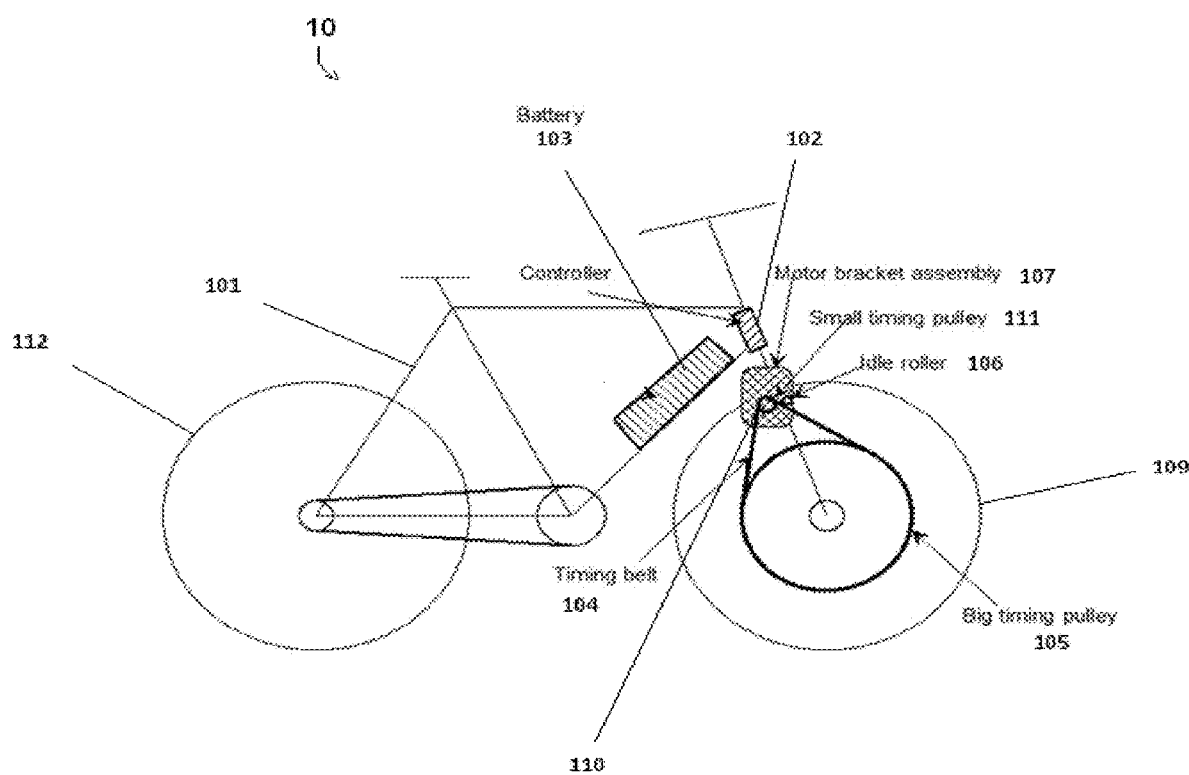

Referring to FIGS. 1a and 1b, the PAS 10 comprises a large diameter wheel pulley 105 anchored onto the bicycle's 101 front wheel 109 spokes, while the motor 110 contains a much smaller diameter drive pulley 111. The pulleys 105, 111 have a 16:1 ratio creating an immense amount of torque, thus enabling the bike 101 to pull a heavy load with ease. This amplified torque technique uses a small, light-weight motor 110, yet develops a powerful driving force. In one embodiment, the battery pack 103 is mounted on the cross bar (FIG. 1a) and in another, the battery pack 103 is mounted on the down tube (FIG. 1b). It will be apparent to one of skill in the art that placement of the battery pack 103 may be of optional design choice without affecting the general scope of the PAS 10.

Figure 2:
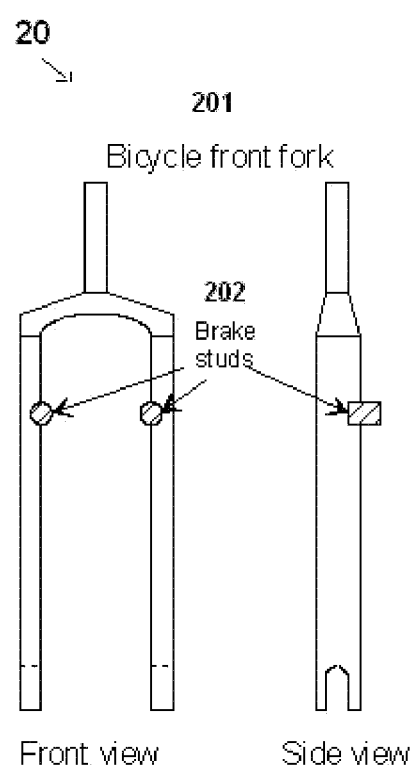
FIG. 2 shows an illustration of a bicycle front fork.

In embodiments, existing brake mounts (202, FIG. 2) located on the front fork (201, FIG. 2) may be used, where a small aluminum bracket 107 mounts a motor 110 and a drive belt idler 106 (see, e.g., FIG. 1a/1b). The bracket assemble 107 has pivoted slot (506, FIG. 10) that may provide a small swivel for drive belt tensioning adjustment. For different bicycle front wheel 109 mount specifications, thin washers may be shimmed for depth adjustment.

Figure 3:
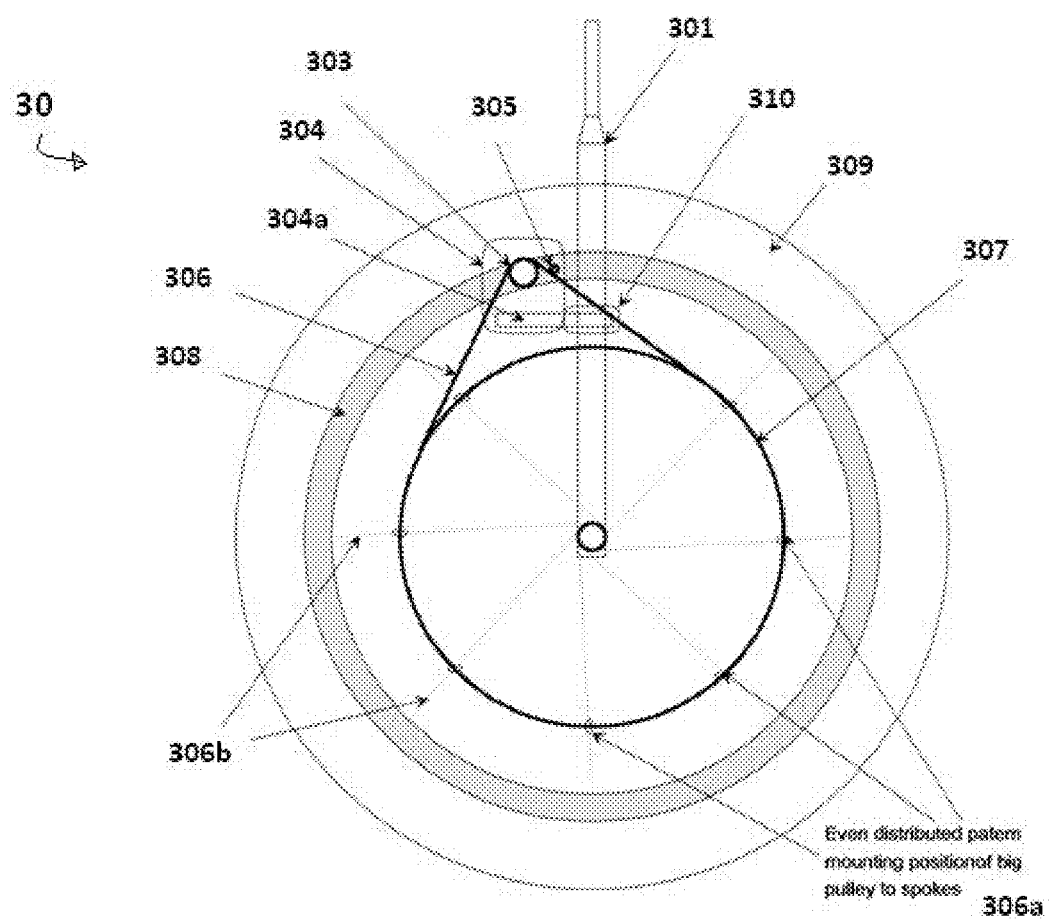
FIG. 3 shows an illustration of the PAS mounted on a front wheel.
Figure 4:
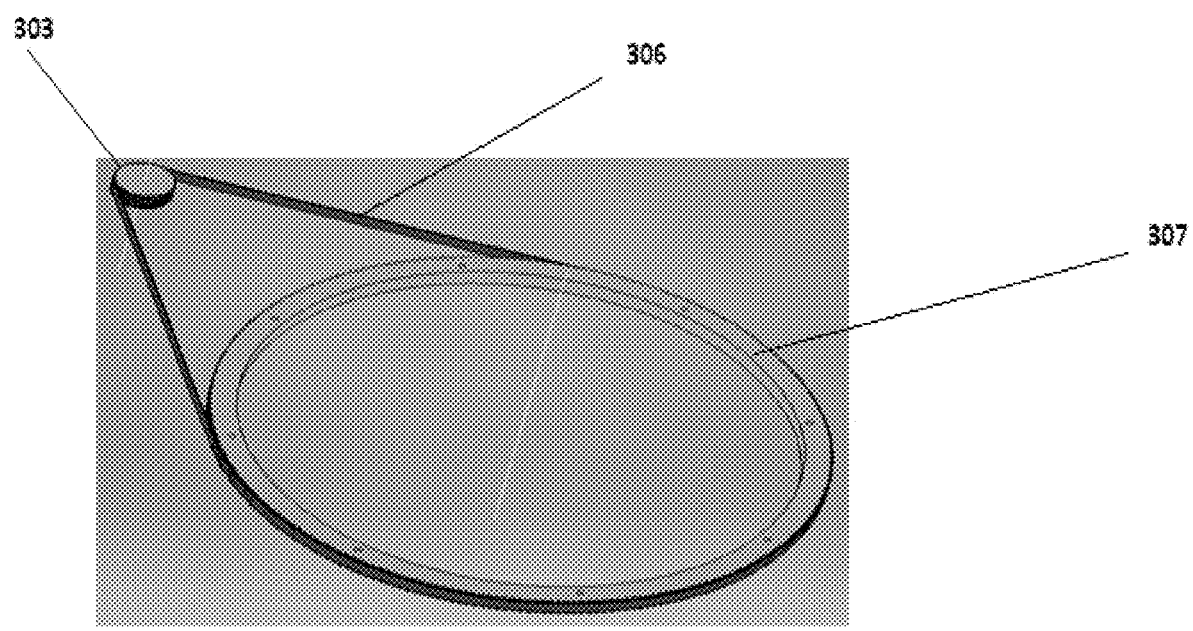
FIG. 4 shows an illustration of the pulley-belt configuration.

Referring to FIG. 3, the Front Wheel Drive Assembly 30 is basically a torque converter comprising a wheel ("big") pulley 307 and a drive ("small") pulley 303, where a tooth pulley belt 306 connects the wheel pulley 307 and drive pulley 303. An illustration showing this assembly as an isolated system is shown in FIG. 4. The embodiment of the motor mounting system 303/304/304a/305/310 is shown in FIG. 3 (i.e., does not use existing brake mounts), and is shown in more detail in FIG. 11.

Figure 5:
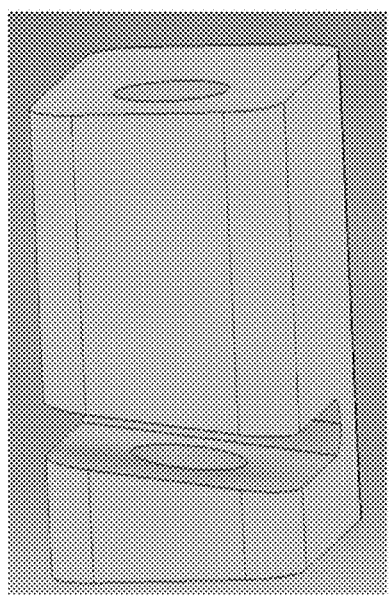
FIG. 5 shows an illustration of a cube adaptor.
Figure 6:
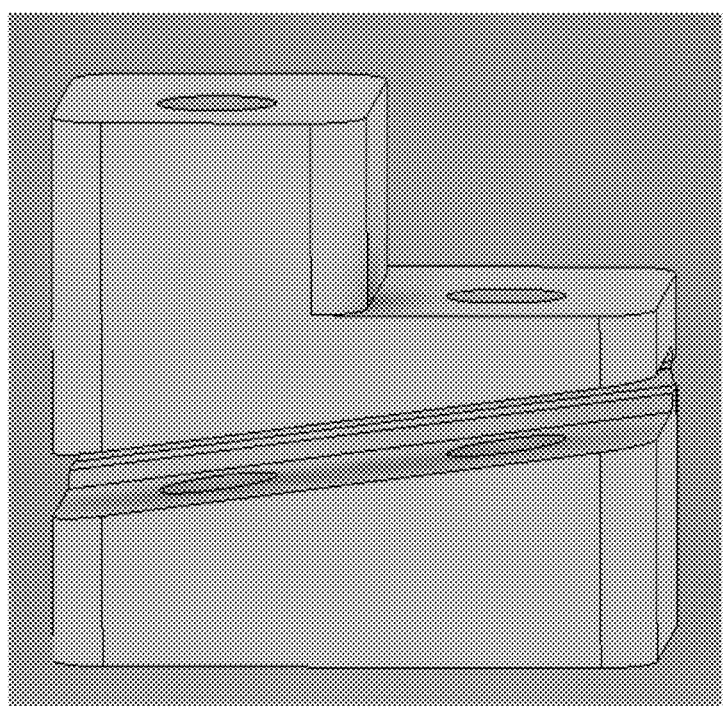
FIG. 6 shows an illustration of a cube adaptor with an alternate configuration.
Figure 7:
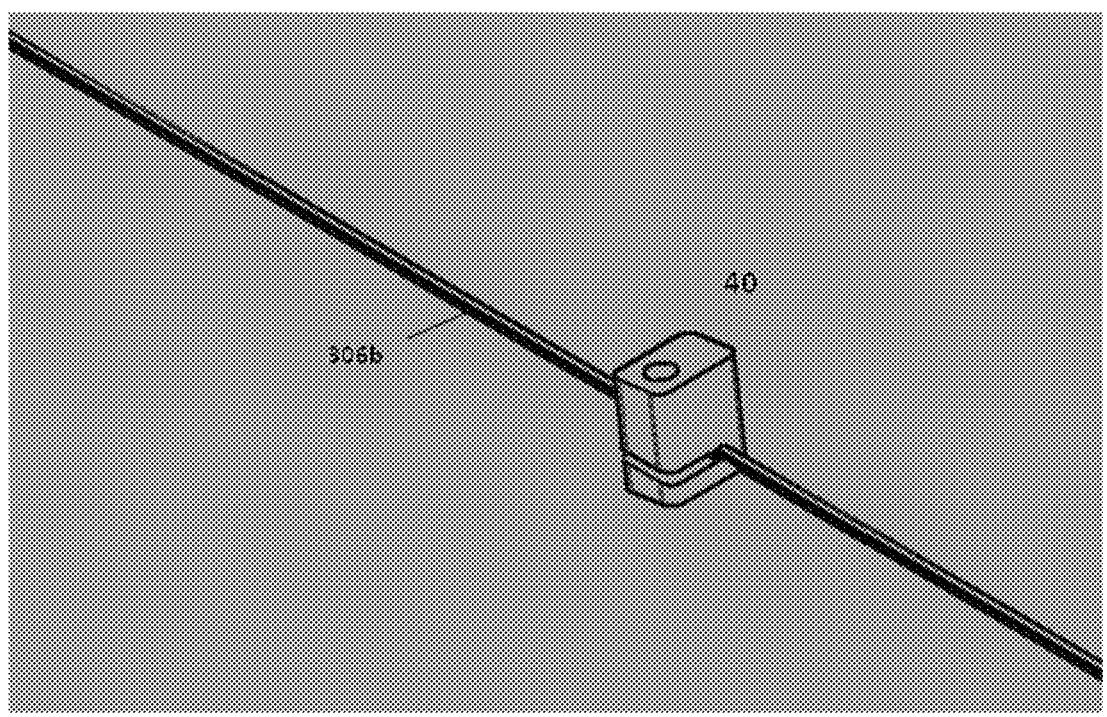
FIG. 7 shows an illustration of the cube adaptor connected to wheel spokes.

As stated above, in order to mount the big pulley 307 to the wheel of a bicycle, for example, a mounting cube 40/40a with a slanted slot is used (see, e.g., FIGS. 5 and 6). Referring to FIG. 7, the cube adaptor 40 is attached to a spoke 306b, where the cube 40 is secured with a single bolt. The cube 40/40a may have two configurations: having a substantially rectangular shape (FIG. 5), with an 8 degree slant, or having a substantially "L" shape (FIG. 6), with a 6 degree slant. In the latter configuration, the angled slot allows for greater surface area contact where the cube 40a straddles the spoke, including the use of a second mounting bolt. Thus, the "grabbing force" acting on the spoke is much greater. Such a cube configuration 40a improves the wheel pulley anchoring points, thereby eliminating the possibility of the big pulley 307 moving away from the center of the wheel; i.e., the second configuration 40a provides a "self centering angle". In embodiments, the anchoring cube adaptors 40/40a may be plastic studs made from a 3D printing technology. FIG. 7 shows an isolated spoke 306b and cube 40 system.

Figure 8A:
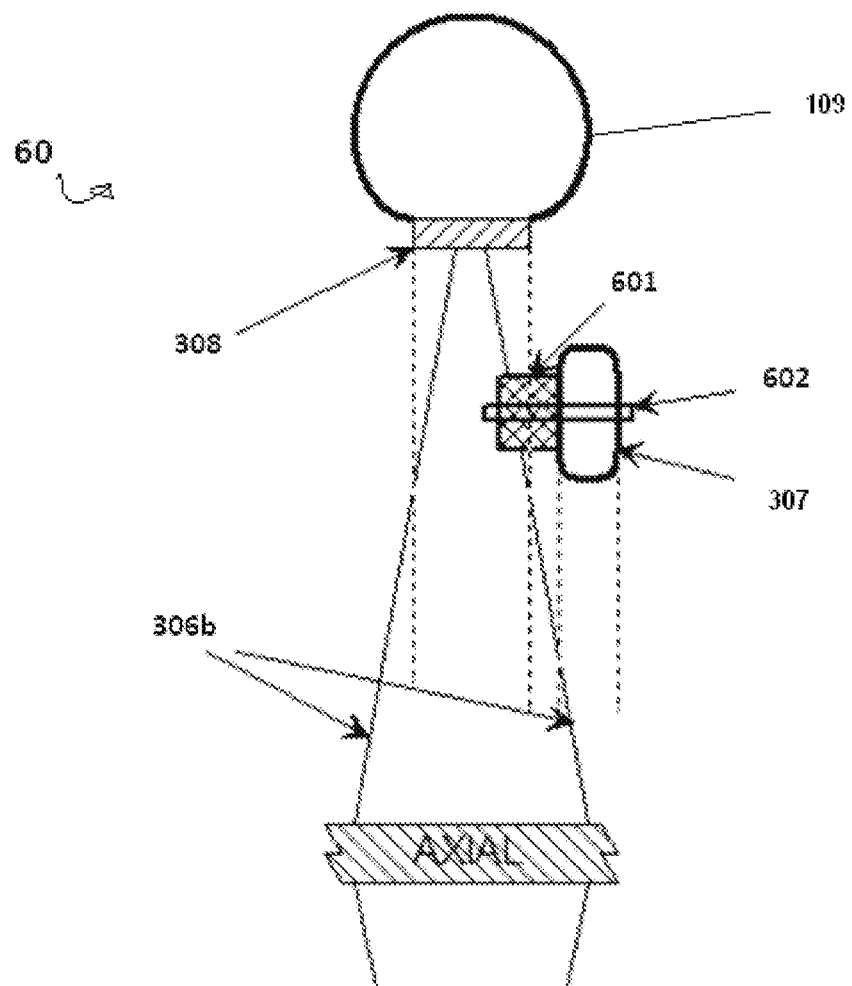
FIGS. 8a and 8b show illustrations of the big-pulley, mounting cube and spoke assembly.
Figure 8B:
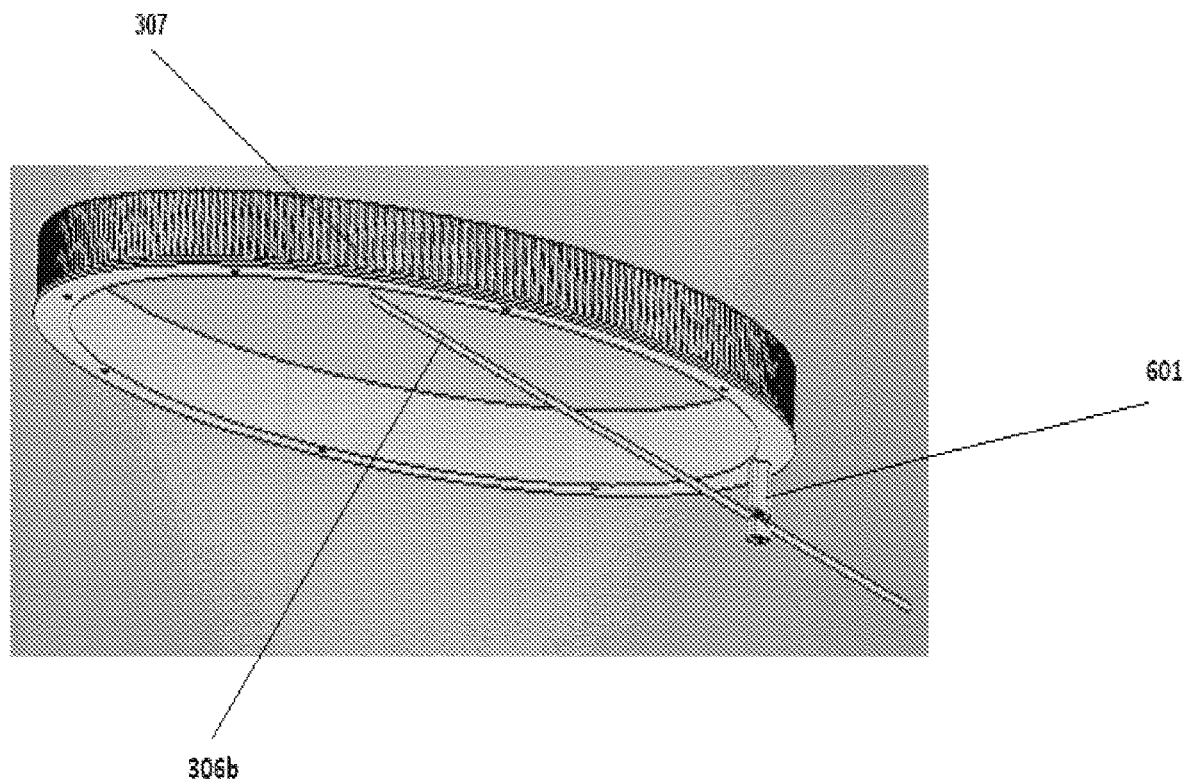

Referring to FIGS. 8a and 8b, mounting cubes 40/40a are located in an evenly distributed pattern between the rim 308 and axial of the wheel. The mounting cubes 40/40a are secured to the spokes 306b through one or more bolts 602. Also shown is an adaptor post 601. An illustration showing this assembly as an isolated system is shown in FIG. 8b.

Figure 9:
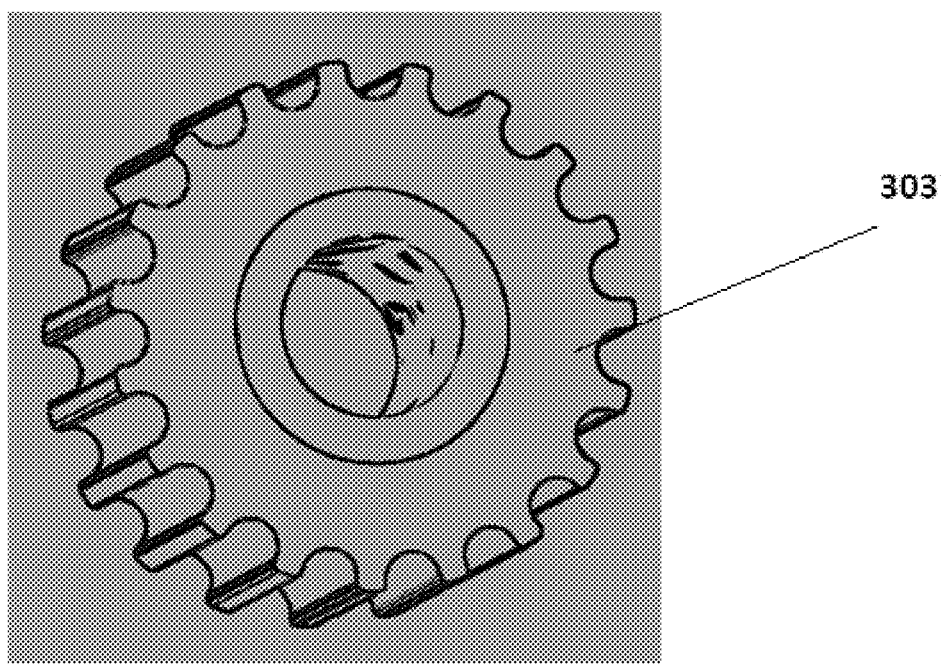
FIG. 9 shows an illustration of the drive pulley with one way bearing clutch.

Referring to FIG. 9, the smaller diameter drive pulley 111 installed on the motor shaft (501, FIG. 10) has a "one-way" bearing function. This one-way bearing 502 disengages the pulley 111 from the motor shaft 501 allowing the front wheel 109 to freely rotate during the time the motor 110 is not powered. In effect, this is similar to the "freewheeling" function found on the rear wheel's 112 (FIGS. 1a and 1b) gear cluster. The PAS 10 allows the rider to use the bike 101 as a normal bike with minimum impact of the additional hardware.

Figure 10:
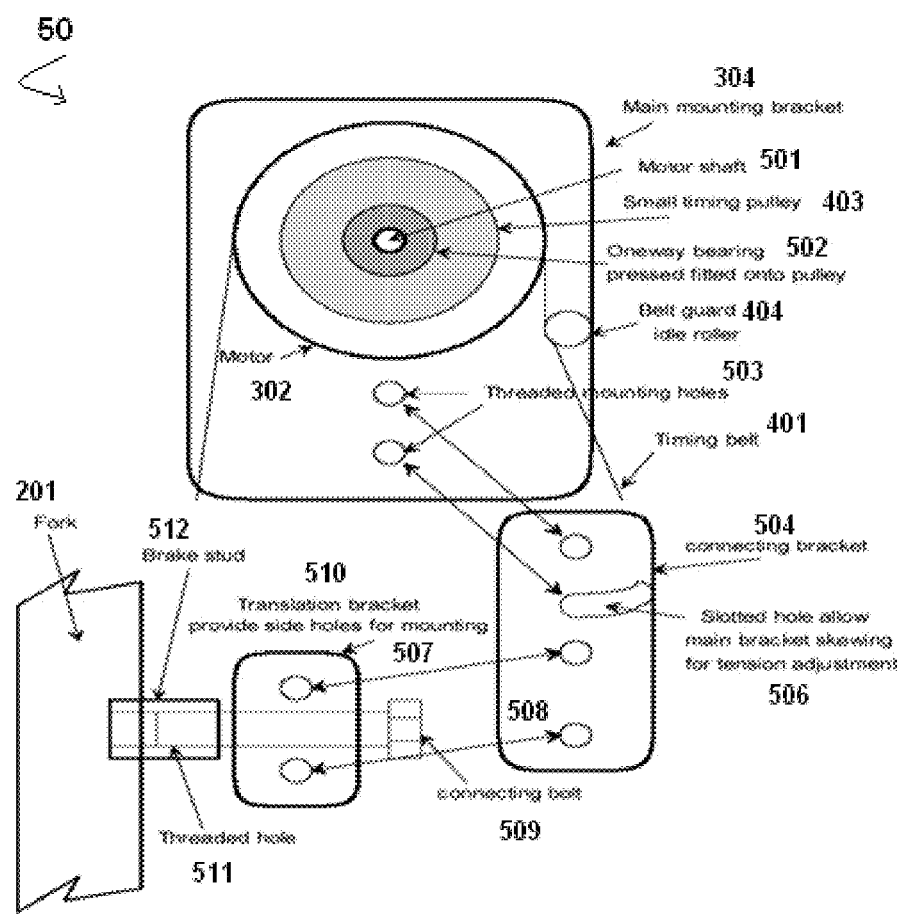
FIG. 10 shows an illustration of a motor and motor bracket assembly.

Referring to FIG. 10, the motor assembly 50 comprises the main motor mount bracket 304, motor shaft 501, small timing pulley 403, one-way bearing 502, which may be pressed fitted onto pulley 403, a belt guard idle roller 404, motor 302, which bracket 304 contains one or more threaded mounting holes 503 for mounting a connecting bracket 504, including that said bracket 504 may contain a slotted hole 506 to allow main bracket 304 skewing for tension adjustment, a transition bracket 510 which provides side holes 507 for mounting of connecting bracket 504, which transition bracket 510 may be mounted onto a break stud 512 for attachment of the motor assembly 50 to a front fork 201.

Figure 11:
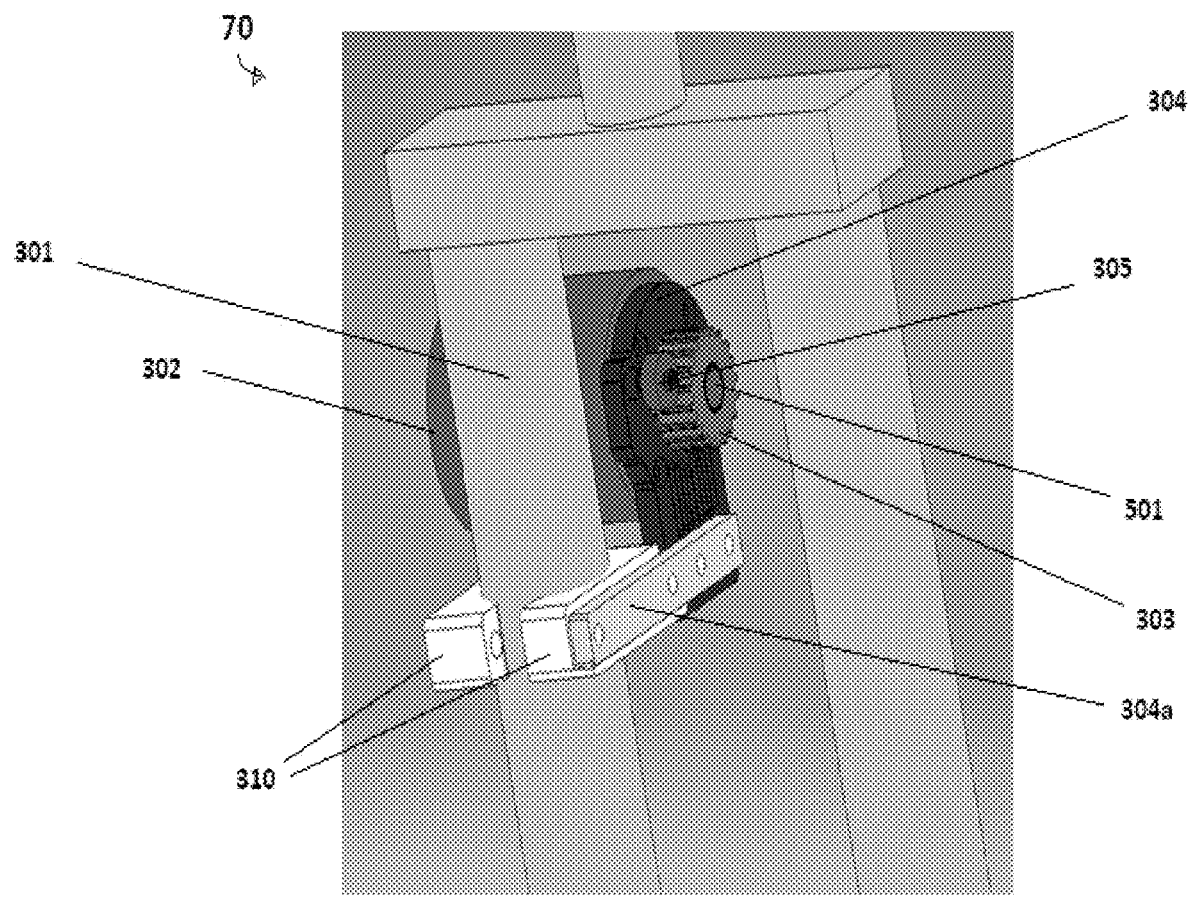
FIG. 11 shows front fork with motor mount assembly.

Referring to FIG. 11, motor mount assembly 70 illustrates a separate embodiment, where the assembly 70 comprises an anchor bracket 310, which consists of two semi-circular parts which clamp onto one of the fork 301 legs, and a straight bar 304a which connects the anchor bracket 310 to the mounting brackets 304.

Figure 12:
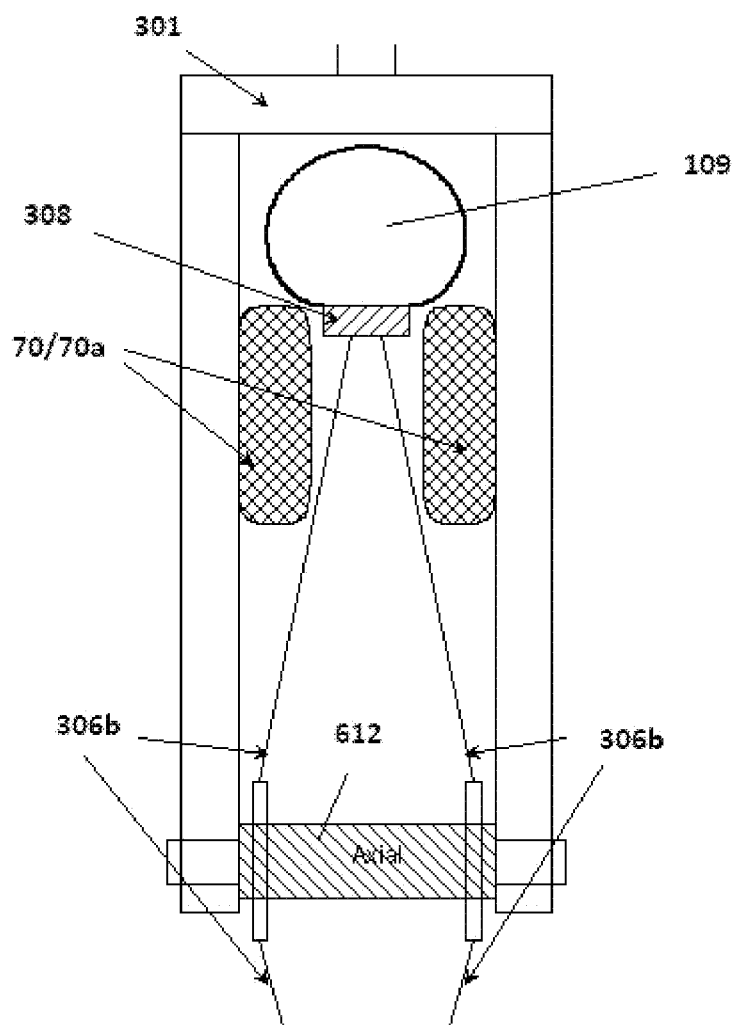
FIG. 12 shows an illustration of an embodiment for placement for mounting drive motor onto front fork (front view).
Figure 13:
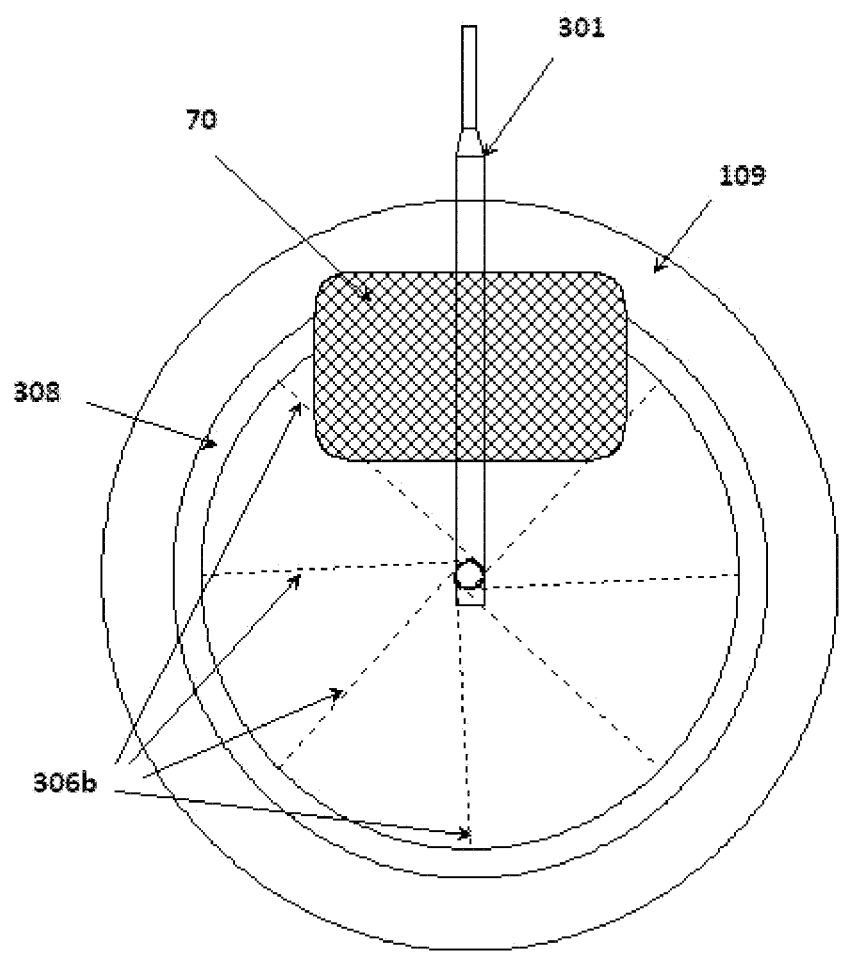
FIG. 13 shows an illustration of an embodiment for placement of the mounting drive motor (side view).

FIG. 12 shows various positions 70 or 70a of the bracket mounting assembly 70 such that the small drive pulley 403 is in the position between the axel 612 and the tire 109. In a related aspect, these locations provide efficient spacing between the wheel axel 612 and the tire 109. Viewed from the side (FIG. 13), these locations 70/70a may be achieved by using either side of the fork's 301 legs. In a related aspect, this mounting system 70/70a works on both types of front fork disc brakes and/or rim breaks.

Figure 14:
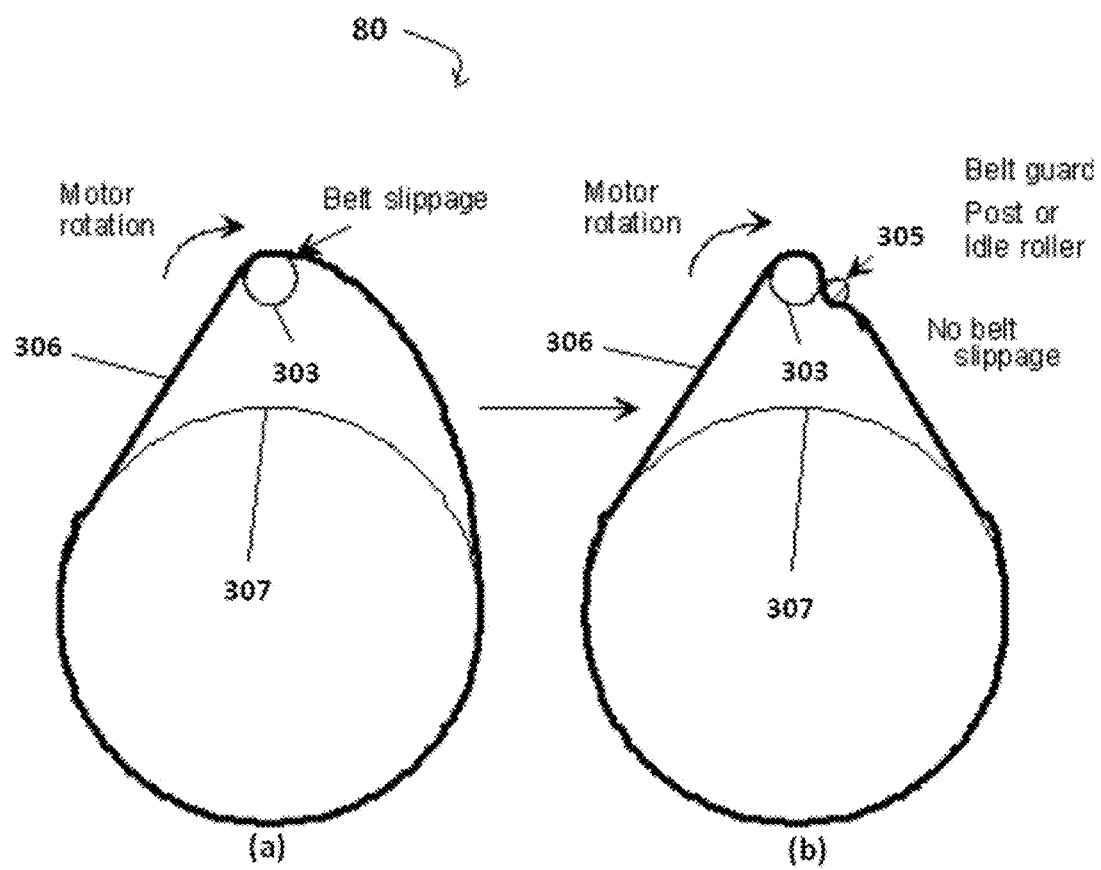
FIG. 14 shows an illustration of belt pulley configurations of the PAS: (a) the belt pulley configuration without a belt guard post (or idle roller) and (b) the belt pulley configuration with a belt guard post (or idle roller).

Referring to FIG. 14, the drive belt 306 with high tension tends to stretch after some usage. It also creates an axial load on the motor shaft (501, FIG. 10). This load translates into a binding friction, restricting the free spinning of the front wheel (308, FIG. 3). However, during hard acceleration with little or no belt tensioning, the drive belt 306 can become loose and slip off the drive pulley 303. In order to keep the belt 306 in place and reduce tensioning load on the pulleys 307, 303, a guard post or idle roller 305 is installed. The idle roller 305 uses ball bearing rings to guide the drive belt 306 at a slight pinching angle. This belt path increases the contacting surface (wrap angle) of the drive belt 306 on to the drive pulley 303, allowing the belt 306 to operate at low tension without slipping.

As disclosed herein, the function of the roller is unique in the way it solves a problem: i.e., belt slippage. In embodiments, the belt wraps around the wheel pulley with over 75% of the full circle covering over 100 teeth of the belt, thus, there is little to no chance of belt slippage at the wheel pulley. On the other hand, the belt wraps around the drive pulley at only 25% of a circle or less, thus, only 4 or 5 teeth are engaged, therefore, when the belt is under low tension it will have slack and teeth may jump when the bike is accelerating. While not being bound by theory, if the belt was set under high tension to prevent belt slippage it would put axial load on the motor and become less efficient just to drive this load. The axial load will also transfer to the rider when the rider pedals, thus becoming a hindrance rather than an assist.

Another negative effect is related to belt tension over time; i.e., the belt would be stretched and lose elasticity if it was set under high tension. That being said, the purpose of the roller is to assure that the belt wrapping around the drive pulley will not skip teeth when there otherwise would be slack in the belt. The roller ensures that pulley teeth are engaged with the belt even when the belt is experiencing low tension. While not being bound by theory, it seems that when the belt is loose, the belt will "float" above the pulley teeth, and teeth skipping will occur. However, because the roller is "hovering" above the belt, this prevents the belt from floating above the teeth, thus, the pulley teeth remain engaged with the belt.

The applied force to drive the front wheel, coupled with the rider's pedaling of the rear wheel, results in a 2-wheel drive bike, enabling the bike to have greater mobility in, for example, slippery conditions. For off-roading and hill-climbing activities, the ability to have 2-wheel drive assisted forward movement increases traction. This new traction enhances the rider's ability to traverse across severe terrain, including difficult incline grades.

As disclosed herein, by adding merely 5 lbs to the overall weight of a bike, the unmodified bike's dynamics is virtually unchanged. While not being bound by theory, the distributed weight is now even more balanced, which provides better stability. In addition, the motor integrates a freewheeling mechanism, which allows the rider to operate the bike normally in the event of a total power drain. As disclosed herein, the battery pack is small and light, which provides assisted power resulting from the efficiency related to the 16:1 drive ratio. The system as disclosed lends itself to a unique solution to urban commuting. For example, the practice of "hyper-gliding" may be exploited to increase travel distance using less peddling.

Although the invention has been described with reference to the above examples, it will be understood that modifications and variations are encompassed within the spirit and scope of the invention. Accordingly, the invention is limited only by the following claims.

We claim:

1. A power assist system for at least one wheel of a multi-wheeled bicycle comprising:
    a power transfer assembly comprising:
        a) a wheel pulley ring mounted on spokes of a front and/or rear wheel of said multi-wheeled bicycle through a plurality of mounting cubes configured to connect the annulus of said wheel pulley ring to said spokes in an evenly distributed pattern around the front and/or rear wheel, wherein said mounting cubes have a rectangular or L-shaped configuration, wherein for any given wheel radius measured from an axle to the inner diameter of a rim of the bicycle wheel comprising said wheel pulley ring, the ratio of (A) the distance between a wheel axle and inside radius of the wheel pulley ring, (B) the distance between the inside and outside radii of the wheel pulley ring, and (C) the distance between the outside radius of the wheel pulley ring and the inside radius of a wheel rim is about 5:1:2.5;
        b) a substantially circular drive pulley operatively connected to a propulsion system; and
        c) a tooth belt operatively engaged with the wheel pulley ring, drive pulley, and the propulsion system;
    wherein said power transfer assembly is operatively coupled to (i) a front and/or rear wheel of the multi-wheeled bicycle and (ii) the propulsion system, which propulsion system comprises a motor and idle roller, wherein the propulsion system is contained on a bracket mounting assembly, and wherein the bracket mounting assembly is releasably coupled to a fork on said front and/or rear wheel of said multi-wheeled bicycle;
    an electric speed control electronically coupled to the motor, wherein the electric speed control is connected to a handle bar or a part of the frame of said multi-wheeled bicycle; and
    a battery pack electrically coupled to the electric speed control, wherein the battery pack is connected to a part of the frame of the multi-wheeled bicycle,
    wherein when the motor is energized by the electric speed control, the front and/or rear wheel of the multi-wheel bicycle rotates,
wherein the mounting cubes as connected and distributed achieve equal load bearing on the spokes and self-centering of said wheel pulley ring on the front and/or rear wheel, and wherein the width of the mounting cubes is less than about 1 but greater than about 0.5 times the distance between the inside and outside diameters of the wheel pulley ring.

2. The power assist system of claim 1, wherein the wheel pulley ring diameter to drive pulley diameter ratio is about 16:1, and wherein said drive pulley is positioned between the tire and wheel axle.

3. The power assist system of claim 1, wherein the mounting cubes contain a slot configured to match the spoke angle of the front and/or rear wheel of the multi-wheeled bicycle.

4. The power assist system of claim 3, wherein the mounting cubes are clamped on to the spokes of the front and/or rear wheel of the multi-wheeled bicycle, and wherein the mounting cubes are configured to (i) contain a flat surface to stably engage the wheel pulley ring and (ii) possess a height sufficient to provide clearance between the clamped spokes and the wheel pulley ring.

5. The power assist system of claim 1, wherein the drive pulley is connected to the motor through a one way bearing clutch.

6. The power assist system of claim 1, wherein the bracket mounting assembly comprises:
    an anchoring bracket containing two substantially rectangular parts having substantially semi-circular inner surfaces along their long axis, wherein the substantially semi-circular inner surfaces are releasably coupled to said fork;
    the propulsion system; and
    an attachment means connecting the anchoring bracket to the propulsion system.

7. The power assist system of claim 1, wherein the motor is a brushless motor.

8. The power assist system of claim 1, wherein the battery is a lithium battery.

9. A power assist system for at least one wheel of a multi-wheeled bicycle comprising:
    a power transfer assembly operatively coupled to (i) a front and/or rear wheel of the multi-wheeled bicycle and (ii) a propulsion system, which propulsion system comprises a motor and idle roller, wherein the propulsion system is contained on a bracket mounting assembly, and wherein the bracket mounting assembly is releasably coupled to a fork on said front and/or rear wheel of said multi-wheeled bicycle, wherein the power transfer assembly comprises:
        a wheel pulley ring mounted on spokes of said front and/or rear wheel of said multi-wheeled bicycle through a plurality of mounting cubes configured to connect the annulus of the wheel pulley ring to said spokes in an evenly distributed pattern around the front and/or rear wheel, wherein said mounting cubes comprise a 7+/−1 degree slot, and wherein for any given wheel radius measured from an axle to the inner diameter of a rim of the bicycle wheel comprising said wheel pulley ring, the ratio of (A) the distance between a wheel axle and inside radius of the wheel pulley ring, (B) the distance between the inside and outside radii of the wheel pulley ring, and (C) the distance between the outside radius of the wheel pulley ring and the inside radius of a wheel rim is about 5:1:2.5;

an electric speed control electronically coupled to the motor, wherein the electric speed control is connected to a handle bar or a part of the frame of said multi-wheeled bicycle; and a battery pack electrically coupled to the electric speed control, wherein the battery pack is connected to a part of the frame of the multi-wheeled bicycle, wherein when the motor is energized by the electric speed control, the front and/or rear wheel of the multi-wheel bicycle rotates, and wherein the power transfer assembly further comprises:

a substantially circular drive pulley operatively connected to said motor; and a tooth belt operatively engaged with the wheel pulley ring, drive pulley, and propulsion system, and wherein the width of the mounting cubes is less than about 1 but greater than about 0.5 times the distance between the inside and outside diameters of the wheel pulley ring.

10. The power assist system of claim 9, wherein the wheel pulley ring diameter to drive pulley diameter ratio is about 16:1.

11. The power assist system of claim 9, wherein the drive pulley is connected to the motor through a one way bearing clutch.

12. The power assist system of claim 9, wherein the bracket mounting assembly comprises:
an anchoring bracket containing two substantially rectangular parts having substantially semi-circular inner surfaces along their long axis, wherein the substantially semi-circular inner surfaces are releasably coupled to said fork;
the propulsion system; and
an attachment means connecting the anchoring bracket to the propulsion system.

13. The power assist system of claim 9, wherein the motor is a brushless motor.

14. The power assist system of claim 9, wherein the battery is a lithium battery.

15. A kit comprising a power transfer assembly comprising:
a) a wheel pulley ring mounted on spokes of a front and/or rear wheel of a multi-wheeled bicycle through a plurality of mounting cubes configured to connect the annulus of said wheel pulley ring to said spokes in an evenly distributed pattern around the front and/or rear wheel, wherein said mounting cubes have a rectangular or L-shaped configuration, and wherein for any given wheel radius measured from an axle to the inner diameter of a rim of the bicycle wheel comprising said wheel pulley ring, the ratio of (A) the distance between a wheel axle and inside radius of the wheel pulley ring, (B) the distance between the inside and outside radii of the wheel pulley ring, and (C) the distance between the outside radius of the wheel pulley ring and the inside radius of a wheel rim is about 5:1:2.5;
b) a substantially circular drive pulley configured to be operatively connected to said motor; and
c) a tooth belt configured to operatively engage with the wheel pulley ring, drive pulley, and propulsion system;
wherein said power transfer assembly is configured to be operatively coupled to (i) a front and/or rear wheel of the multi-wheeled bicycle and (ii) a propulsion system, which propulsion system comprises a motor and idle roller, wherein the propulsion system is contained on a bracket mounting assembly, and wherein the bracket mounting assembly is configured to be releasably coupled to a fork on said front and/or rear wheel of said multi-wheeled bicycle;
an electric speed control electronically configured to be coupled to the motor, wherein the electric speed control is configured to be connected to a handle bar or a part of the frame of said multi-wheeled bicycle;
a battery pack configured to be electrically coupled to the electric speed control, wherein the battery pack is configured to connect to a part of the frame of the multi-wheeled bicycle;
a container comprising said power transfer assembly; and
a manual comprising instructions on assembling the power transfer assembly,
wherein the mounting cubes as connected and distributed achieve equal load bearing on the spokes and self-centering of said wheel pulley ring on the front and/or rear wheel, and wherein the width of the mounting cubes is less than about 1 but greater than about 0.5 times the distance between the inside and outside diameters of the wheel pulley ring.

16. The kit of claim 15, wherein the mounting cubes contain a slot configured to match the spoke angle of the front and/or rear wheel of the multi-wheeled bicycle, and wherein the width of the cubes is greater than about 90% but less than about 100% of the distance between the inner and outer diameters of the wheel pulley ring.

17. The kit of claim 15, wherein the bracket mounting assembly comprises:
an anchoring bracket containing two substantially rectangular parts having substantially semi-circular inner surfaces along their long axis, wherein the substantially semi-circular inner surfaces are configured to be releasably coupled to said fork;
the propulsion system; and
an attachment means configured to connect the anchoring bracket to the propulsion system.

* * * * *